Dec. 30, 1969 C. W. CARTER ET AL 3,486,582
LUBRICATION SYSTEM FOR A GAS TURBINE ENGINE
Filed Oct. 30, 1967 2 Sheets-Sheet 1
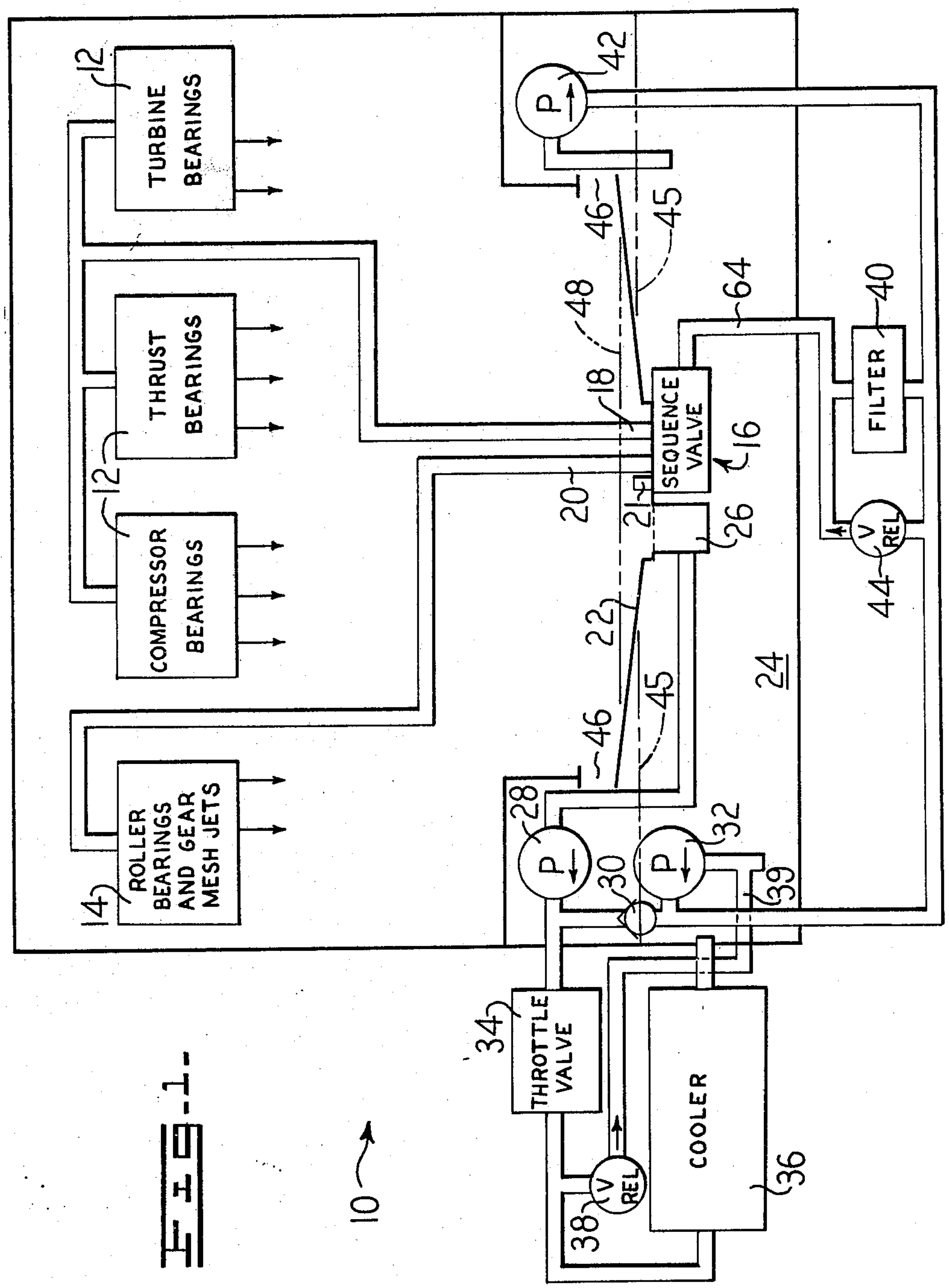
INVENTORS
CARL W. CARTER
LLOYD E. JOHNSON
BY
Fryer, Tjensvold, Feix, Phillips & Lempio
ATTORNEYS Dec. 30, 1969 C. W. CARTER ET AL 3,486,582
LUBRICATION SYSTEM FOR A GAS TURBINE ENGINE
Filed Oct. 30, 1967 2 Sheets-Sheet 2
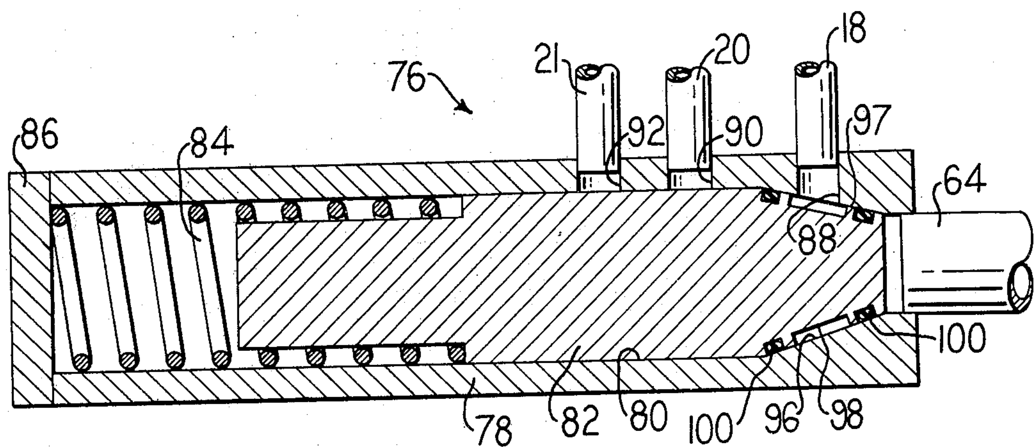
FIG-2-
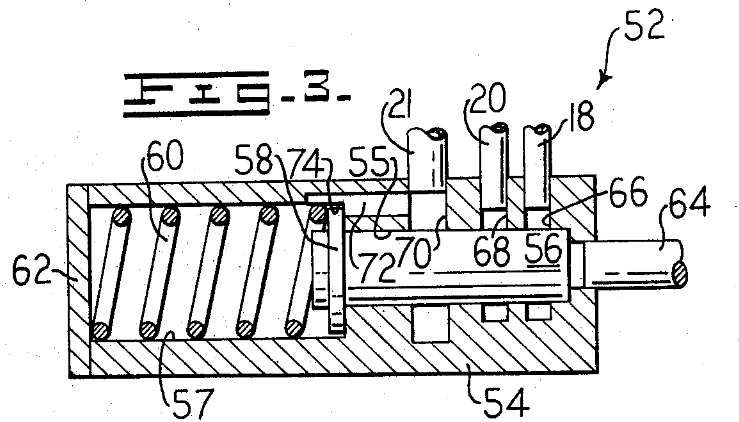
FIG-3-
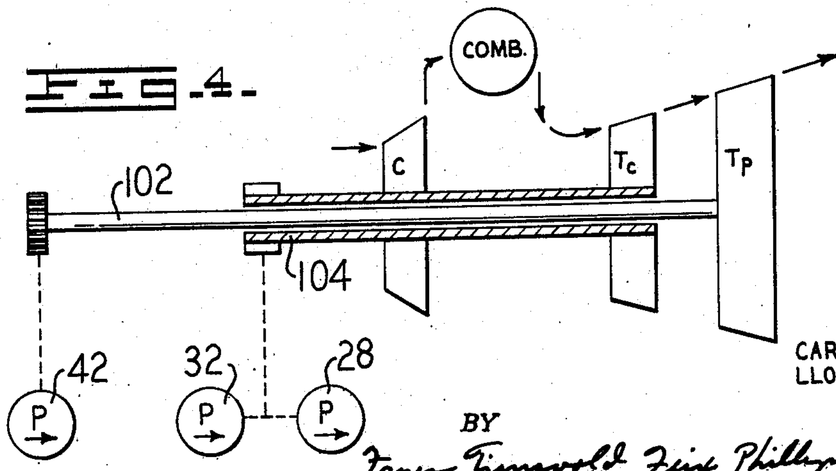
FIG-4-
INVENTORS
CARL W. CARTER
LLOYD E. JOHNSON
BY Fryer, Tjensvold, Feix, Phillips & Lempio
ATTORNEYS United States Patent Office 3,486,582

Patented Dec. 30, 1969

3,486,582

LUBRICATION SYSTEM FOR A GAS TURBINE ENGINE

Carl W. Carter, Peoria, and Lloyd E. Johnson, East Peoria, Ill., assignors to Caterpillar Tractor Co., Peoria, Ill., a corporation of California Filed Oct. 30, 1967, Ser. No. 678,790
Int. Cl. F01m *1/00;* F02g *3/00;* F02c *7/06*
U.S. Cl. 184—6 12 Claims

ABSTRACT OF THE DISCLOSURE

A lubrication system for selectively directing oil to critical components of a gas turbine engine during start-up and run-down of the engine uses a sequence valve. The system combines a scavenge pump with a supply pump to increase the oil capacity and includes a hot sump with large surface area and a deep pocket for the scavenge pump inlet to minimize entrainment of air and cavitation damage to the pump, while also minimizing the overall time oil is allowed to remain in the hot sump by limiting the volume of that sump.

BACKGROUND OF THE INVENTION

When the bearings on high speed shafts of a gas turbine engine are hydrodynamic sleeve bearings, it is necessary to supply lubricating oil to them before, or immediately upon, engine start-up. It is also desirable to allow air (entrained in the oil during lubrication) to escape, and at the same time to furnish an uninterrupted supply of oil to the scavenge pump from the hot sump so that the pump does not suck air and thus re-aerate the oil. Further, the rate of oil deterioration by oxidation and other chemical reactions increases rapidly with increase in temperature so it is desirable to design a system that minimizes the portion of the total oil flow cycle time that the oil is allowed to be at high temperature from heat picked up in performing its lubricating and cooling functions.

Various prior art oil directing systems provide the hydrodynamic bearings of an associated turbine engine with oil at start-up by using accumulators, or by using pre-start pumps which often consist of simply a hand pump.

Other prior art systems do not allow the hot sump to overflow into the cool sump. These systems must use a scavenge pump which may, under some circumstances of operation, have a greater capacity than the amount of oil returning to drain. Such systems can force the scavenge pump to suck air, and this can result in cavitation damage to the pump and increased mixing of air in the oil, thus aggravating the ever present air separation problem.

SUMMARY OF THE INVENTION

The invention locates a hot sump directly below the gear case so that lubricating oil returning to the drain is dumped into it by gravity. A scavenge pump routes a large percentage, but not all, of the hot sump oil supply to a cooler and returns it to a cool sump where two supply pumps, one gasifier driven and one power turbine driven, furnish lubricating oil to the hydrodynamic bearings. The portion of the hot oil that does not go through the cooler overflows into the main sump where it is immediately cooled by mixing with the main volume of cooled oil.

The present invention overcomes the shortcomings of the prior art by use of a scavenge pump which combines with a supply pump during start-up and run-down to increase the amount of lubricating oil supplied to the hydrodynamic bearings. A sequence valve function is added to the system pressure regulating valve. One valve directs the oil to the hydrodynamic bearings only untll the supply of oil is adequate to lubricate all of the engine components. The sequence valve then shifts to a position in which the oil is supplied to all of the engine components. As flow increases above the amounts needed by all components, the valve shifts to open a discharge back to the sump at a preset maximum pressure which it then serves to regulate. The invention eliminates the need for an accumulator, a pre-start pump, or larger size pumps as is common in prior art systems.

In addition, the invention system embodies a hot sump of special design to produce a large surface area with a minimum volume of oil which allows much of the entrained air to escape from the oil. A deep oil pocket at the scavenge pump inlet insures that the pump does not suck air, since the pocket provides an oil supply which is greater than the pump capacity.

In one embodiment the sequence valve, besides selectively directing the lubricating oil in response to pressure, also seals the line leading from the valve to the bearings to prevent the oil from draining through the valve to the sump after engine shutdown. On subsequent start-up, this trapped oil is immediately available for lubrication of the bearings.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIGURE 1 is a block schematic flow diagram of the lubricating system of the invention;

FIGURES 2 and 3 are cross-section views of sequence valves which may be utilized as a part of the lube system of FIGURE 1; and FIGURE 4 is a simplified cross-section view of the spools of a gas turbine engine depicting in phantom line the drive system connection between the engine and the pumps.

DESCRIPTION OF THE PREFERRED EMBODIMENTS

FIGURE 1 shows a lubricating system 10, constructed in accordance with one embodiment of the invention, for selectively directing lubricating oil to various hydrodynamic bearings 12 of a gas turbine engine (not shown) during the start-up and run-down periods of operation, and for supplying oil to other components 14 of the engine after start-up.

A sequence valve 16 is located in the lines leading to the engine components 12 and 14 with an outlet 18 connected to the bearings 12 and an outlet 20 connected to other components 14 of the engine. A third outlet 21 is connected to a sump 22.

The sequence valve 16 may be located near the hot sump 22 as shown.

The hot sump 22 is in turn positioned immediately above a cool sump 24.

The hot sump 22 is below the gear train of the engine, and lubricating oil returning to the drain is dumped into the hot sump 22 by gravity.

A screened scavenge pocket 26 is formed in the bottom of the hot sump 22, and an oil line connects the pocket to a scavenge pump 28.

The pump 28 is connected by way of a check valve 30 to a line leading from a supply pump 32, and also by way of a throttle valve 34 to a heat exchanger or oil cooler 36.

A pressure bypass valve 38 is located in the lines between the throttle valve 34 and the cool sump 24 by connecting to the inlet from the sump to the pump 32. The cooler 36 is also connected to the cool sump 24.

The supply pump 32 outlet line is connected to an oil filter 40. A second supply pump 42 is also connected to the filter 40. The outlet of filter 40 is connected to the inlet of the sequence valve 16. A filter bypass valve 44 is connected across the inlet and outlet of the filter 40. Both supply pumps 32 and 42 have inlet pipes which draw oil from the cool sump 24. The cool sump operates at an oil level indicated by numeral 45.

In operation, all the oil from the engine and gear train lubrication and the oil bypassing the sequence valve 16 is returned to the hot sump 22. To help remove entrained air out of the returning oil the hot sump 22 is formed with a shallow configuration having a large surface area.

The screened scavenge pocket 26, to which the inlet of the scavenge pump 28 is connected provides a large oil reservoir to insure that there is always a supply of oil of the pump 28. This is due to the hot sump 22 configuration wherein the oil never drops below the level of a series of overflow ports 46, but operates at a hot sump operating level indicated by the dashed line 48.

The scavenge pump 28 removes most of the hot sump oil from the screened scavenge pocket 26 and pumps it to the oil cooler 36 by way of the throttle valve 34. The portion of the oil which is not pumped to the cooler 36 is allowed to pass directly to the cool sump 24 by way of the series of overflow ports 46 which are formed in the outer periphery of the hot sump 22.

While operating at low speeds and consequently low oil flow rates, such as with the free turbine stalled or during starting or coast-down when stopping, the operating pressure in the line extending between the scavenge pump 28 and throttle valve 34 may be below the setting of the throttle valve 34, and the outlet pressure developed by the combined flows of pumps 32 and 42 may be too low to keep the check valve 30 closed. Some or all of the oil from the scavenge pump 28 may then pass through the check valve 30 and combine with the oil being delivered by the gasifier driven supply pump 32. The trottle valve 34 and the check valve 30 are set to operate in the above manner during engine start-up and run-down. The amount of oil supplied to the engine is increased (by the amount pumped by pump 28) during these operating periods.

The gasifier turbine speed (shaft 104 of FIGURE 4) is greater at the start than the speed of the power turbine (shaft 102 of FIGURE 4). Accordingly, the output of the scavenge pump 28, which also has a relatively greater output capacity than the supply pump 32 during this condition of operation, is added to the system in an effective manner.

The power turbine driven supply pump 42 is not rotating during the initial portion of two-shaft operation of the engine.

Under normal operating conditions, the power turbine driven supply pump 42 adds its flow of oil to that from the supply pump 32 to supplement the total oil being delivered to the engine.

The combined volume of supply pumps 32 and 42 is generally twice that required by the engine when operating at full speed so that full lubrication pressure is provided whenever the sum of the speeds of the gasifier and power turbine is 50% or more of their full speeds.

The cooler 36 and the pressure bypass valve 38 act as a self-governing temperature regulating system as well as providing protection for the scavenge pump 28 and the cooler 36 against high pressure build-up. Cool oil which does not need to pass through the cooler 36 has a higher viscosity which produces a greater pressure in the line leading to the cooler 36. The pressure bypass valve 38 is thus forced open by the increased pressure and allows oil to pass to the inlet of the gasifier driven supply pump 32 through line 39. During a cold start of the engine, when the throttle valve 34 and the bypass valve 38 pressure settings are quickly surpassed, the oil which is delivered by the supply pump 32 is the warmest available oil due to the increased temperature imparted thereto by its movement across the pump, throttle valve and bypass valve. Thus, the warmest available oil is used for a cold engine start. When the oil becomes hot its viscosity, and thus the pressure exerted thereby in the line, drops and the pressure bypass valve 38 closes; and all the hot oil passes into the cooler 36. Upon cooling, the oil is then returned to the cool sump 24.

All oil directed to the engine and gear train passes through the oil filter 40 or through the filter bypass valve 44, and then to the sequence valve 16. When pressure is low, as during the start-up or run-down periods, the sequence valve is adapted to direct oil to the more critical engine hydrodynamic main shaft bearings 12. Upon reaching a preselected pressure, the sequence valve 16 opens farther and allows oil to pass through the line 20 to the less critical components 14 of the engine.

FIGURE 3 shows one embodiment of a priority type sequence valve 52 which can be used as the sequence valve 16 of FIGURE 1. A valve housing 54 has coaxial internal bores 55 and 57 of different diameters. A piston 56 slides within the bore 55 and has a washer 58. The washer bears against a spring 60 in the internal bore 57. The spring abuts an end cap 62.

An inlet pipe 64 is connected to the other end of the valve housing 54. Ports 66, 68 and 70 extend through the wall of the valve housing 54. Port 70 is also connected by a passageway 72 to the internal bore 57.

In operation, oil which is introduced to the valve 52 through the inlet pipe 64 forces the piston 56 against the spring 60. When there is a relatively low pressure in inlet pipe 64, the piston is moved against spring 60 to open port 66. The oil from port 66 flows through line 18 to the more critical components of the engine, hydrodynamic bearings 12 of FIGURE 1.

As the pressure in inlet pipe 64 increases, the port 68 is opened to allow the passage of oil to line 20 and the less critical components of the engine, components 14 of FIGURE 1.

As the pressure in inlet pipe 64 continues to rise, the piston 56 is moved still farther along the bore 55 to open the port 70, allowing the pressure to be relieved into the hot sump through outlet 21.

Passageway 72 connects and vents the cavity formed by internal bore 57 to the discharge line 21. The oil filled cavity serves as a dash pot for limiting rapid movement of the piston 56 except when the valve is moving to open the first port 66. Piston movement is damped by the action of the oil on the washer 58 in a controlled clearance annulus 74 between the periphery of the washer 58 and the surrounding bore 57 after the piston has moved far enough to close connection of port 70 to the cavity in bore 57. This damping of the piston improves the stability and eliminates fluttering of the sequence valve 52 when regulating system pressure without slowing down initial opening during the critical period of engine start.

FIGURE 2 shows an alternative embodiment 76 of the sequence valve 16. In valve 76 a valve housing 78 has an internal bore 80, a piston 82, a spring 84 held within the bore 80 by an end cap 86, and a series of outlet ports 88, 90 and 92. The valve 76 does not contain the dash pot feature, but this feature could be included if desired.

The inlet pipe 64 transmits oil to the internal bore 80. The internal bore 80 is tapered inwardly at the end connected to the inlet pipe 64, in the region of the outlet port 88, to define a tapered seal seat 96. The end of piston 82 is likewise tapered to provide a matching seal surface 97. An annular groove 98 is formed in the tapered seal surface 97 in register with the outlet port 88, and O-rings 100 are provided at either side thereof. The O-rings provide a positive seal when the valve is closed.

The valve 76 controls the oil sequencing in a manner similar to the valve 52 of FIGURE 3. However, after the oil pressure has dropped following engine shutdown, the tapered seal surface 97 of piston 82 abuts the matching seal seat 96 of the internal bore 80. The O-rings 100 seal the annular groove 98 and thus the outlet port 88 so that the oil in line 18 and those line connected to it cannot leak out during extended periods of engine shutdown. On subsequent engine start-up the oil line extending from the sequence valve 76 (sequence valve 16 of FIGURE 1) to the critical components of the engine (e.g., bearings 12 of FIGURE 1) will already have oil. This oil flows to the bearings immediately upon subsequent start-up.

The O-ring 100 are disposed in the tapered seal surface 97 so that as the piston 82 moves back past the outlet ports 88, 90 and 92 the O-rings are not damaged by the port openings.

FIGURE 4 shows the two-shaft configuration of the gas turbine engine and the manner of coupling the shafts to respective pumps 28, 32 and 42 of FIGURE 1. The power turbine driven supply pump 42 is driven by a shaft 102, and the gasifier driven supply pump 32 and scavenge pump 28 are driven by a shaft 104.

As previously noted, the outputs from the supply pump 42 and the scavenge pump 28 are selectably added to the total flow of oil which is directed to the sequence valve to provide an increase of capacity during the start-up and run-down periods of operation.

While we have illustrated and described the preferred embodiments of our invention, it is to be understood that these are capable of varitaion and modification, and we therefore do not wish to be limited to the precise details set forth.

We claim:

1. A lubrication system for a gas turbine engine comprising, an oil supply pump, first conduit means for conducting oil from the pump to critical components of the engine and second conduit means for conducting oil from the pump to less critical components of the engine, and a sequence valve operatively associated with the first and second conduit means and effective to direct oil through only the first conduit means on start-up and rundown of the engine and effective to direct oil through both the first and second conduit means during normal operation of the engine.

2. A lubrication system for a gas turbine engine comprising, a cool sump, a hot sump located above the cool sump and having a shallow configuration to maximize the surface area of the oil in the hot sump and to minimize the volume of the oil in the hot sump and overflow ports at the ends of the sump for returning excess hot oil directly to the cool sump by gravity flow, and a scavenge pump for pumping oil from the hot sump through an oil cooler and to the cool sump, and wherein the hot sump has a deep scavenge pocket for ensuring a continuous supply of oil to the scavenge pump to prevent aeration of the oil by the scavenge pumping operation.

3. A lubricating system for gas turbine engines having a gasifier turbine and a power turbine, the system providing lubricating oil to the critical as well as less critical components of the engine, comprising the combination of, hot sump means disposed to receive returning oil from the engine components gravity feed, cool sump means disposed to receive an overflow of oil from said hot sump means, supply pump means disposed to withdraw oil from the sump means, scavenge pump means disposed to withdraw oil from the hot sump, means, sequence valve means coupled to said supply pump means for selectively introducing oil to said critical and less critical components, a heat exchanger for cooling oil pumped from the scavenge pump, and valve means coupled to said scavenge pump means and effective to add the oil withdrawn from the scavenge pump to the oil withdrawn by the supply pump means during start-up and run-down periods of engine operation and to send the oil from the scavenge pump through said heat exchanger during other periods of engine operation.

4. The lubricating system of claim 3 wherein said hot sump means includes a shallow tray and a deep scavenge pocket in the tray to maximize the surface area while minimizing the volume of the oil in the hot sump means, said scavenge pump means being connected to withdraw oil from the scavenge pocket.

5. The lubricating system of claim 4 wherein said hot sump means has a series of overflow ports at the ends of the tray to define the hot sump oil operating level.

6. The lubricating system of claim 3 wherein said supply pump means includes a first and second supply pump coupled at their outlets to the sequence valve means and at their inlets to the cool sump means, wherein said first and second supply pumps are driven by the engine gasifier turbine and the engine power turbine, respectively, and said scavenge pump is driven by the engine gasifier turbine.

7. The lubricating system of claim 3 wherein said sequence valve means has a first outlet port coupled to the critical engine components to provide oil thereto when said pumps introduce oil to the sequence valve means under a preselected pressure, and a second outlet port coupled to the less critical engine components to simultaneously provide oil thereto upon a selected increase in the preselected pressure and wherein only the first port is opened during the start-up and run-down of said engine.

8. The lubricating system of claim 7 wherein said sequence valve means further includes a resilient seal at the first outlet port to seal the port upon closure of the sequence valve means.

9. The lubricating system of claim 3 wherein said valve means further comprises, throttle valve means connected between the scavenge pump means and the heat exchanger, bypass valve means connected between the output of the throttle valve means and the input to the supply pump means, and check valve means connected between the scavenge pump means and the supply pump means outlet, wherein said check valve means opens in response to a selected pressure differential between thc supply pump and scavenge pump so that oil from said scavenge pump means is added to that from the supply pump means during start-up and run-down of the engine.

10. The lubricating system of claim 9 wherein said bypass valve means opens in response to a selected pressure in the output of the throttle valve means as determined by the oil viscosity, whereupon oil is introduced from the scavenge pump means to the inlet of the supply pump means rather than to the heat exchanger.

11. A lubrication system for a gas turbine engine comprising, an oil supply pump, first conduit means for conducting oil from the pump to critical components of the engine and second conduit means for conducting oil from the pump to less critical components of the engine, a combination sequence and regulating valve operatively associated with the first and second conduit means and effective to direct oil through only the first conduit means on start-up and run-down of the engine and effective to direct oil through both the first and second conduit means during normal operation of the engine, and bypass means associated with said combination sequence and regulating valve effective to regulate the maximum system pressure in said first and second conduit means by bypassing oil to a sump when the system pressure builds up to a preset maximum pressure.

12. A lubricating system as defined in claim 11 wherein said combination sequence and regulating valve include a cylinder, a piston operating in a limited clearance in an oil filled chamber in the cylinder, and a vent opening in the cylinder located to provide a dash pot action but only during the time that the valve is effective to direct oil through both the first and second conduit means.

References Cited

UNITED STATES PATENTS 1,799,271 4/1931 Woolson ------------- 184—6
1,906,538 5/1933 Church.
2,374,822 5/1945 LeClair.
2,408,914 10/1946 Clark et al. ---------- 184—6

2,493,350 1/1950 Jaynes ------------- 123—196
2,512,189 6/1950 Waterman.
3,045,419 7/1962 Addie et al ------- 184—6 XR

FOREIGN PATENTS 493,553 10/1938 Great Britain.

FRED C. MATTERN, Jr., Primary Examiner

M. A. ANTONAKAS, Assistant Examiner

U.S. Cl. X.R.

60—39.08; 123—196

PO-1050
(5/69)

UNITED STATES PATENT OFFICE
CERTIFICATE OF CORRECTION

Patent No. 3,486,582 Dated December 13, 1969

Inventor(s) CARL W. CARTER, et al

It is certified that error appears in the above-identified patent and that said Letters Patent are hereby corrected as shown below:

Column 5: line 70, --by-- should be inserted after "components"; line 73, --cool-- should be inserted before "sump"; line 74, the comma after "sump" should be deleted.

SIGNED AND
SEALED
JUN 23 1970

(SEAL)
Attest:

Edward M. Fletcher, Jr.
Attesting Officer

WILLIAM E. SCHUYLER, JR.
Commissioner of Patents